Dec. 9, 1952  A. I. ROMAN  2,621,001
CONVERTI-PLANE
Filed May 10, 1948  7 Sheets-Sheet 1

INVENTOR.
ALFRED I. ROMAN
BY
ATTORNEY

Dec. 9, 1952      A. I. ROMAN      2,621,001
CONVERTI-PLANE Filed May 10, 1948      7 Sheets-Sheet 4

INVENTOR.
ALFRED I. ROMAN
BY
ATTORNEY

Dec. 9, 1952 A. I. ROMAN 2,621,001
CONVERTI-PLANE
Filed May 10, 1948 7 Sheets-Sheet 5

INVENTOR.
ALFRED I. ROMAN
BY
ATTORNEY

Dec. 9, 1952            A. I. ROMAN            2,621,001

CONVERTI-PLANE

Filed May 10, 1948                                    7 Sheets-Sheet 6

INVENTOR.
ALFRED I. ROMAN
BY
*[signature]*
ATTORNEY

Dec. 9, 1952 — A. I. ROMAN — 2,621,001
CONVERTI-PLANE

Filed May 10, 1948 — 7 Sheets-Sheet 7

INVENTOR.
ALFRED I. ROMAN
BY
ATTORNEY

UNITED STATES PATENT OFFICE 2,621,001

CONVERTI-PLANE

Alfred I. Roman, New York, N. Y.

Application May 10, 1948, Serial No. 26,217

17 Claims. (Cl. 244—7)

This invention relates to new and useful improvements in aircraft, and has more particular reference to an aircraft having wings provided with propulsion means and movable between horizontal and vertical positions for facilitating horizontal flying and vertical ascending and descending. The present application is a continuation-in-part of my earlier application, Serial No. 9,882 filed on February 20, 1948, now abandoned.

The wing area of conventional airplanes is determined by their landing speeds. At cruising speeds their wing area is far in excess of what is required at that speed so that it is not possible to incorporate slow landing speed with high cruising speed in the same airplane. Present day helicopters have the advantage of high maneuverability and the ability to take off and land in restricted areas. However, the helicopters are very inefficient in forward flight, as only a small component of their total engine power is utilized for forward thrust, and although helicopter builders have steadily increased the power of their craft, very little increase in forward speed has been realized.

The present invention proposes an aircraft with wings rotatable about their spars and with propellers mounted on the leading edges of the wings, so that the propellers move with the wings to revolve in a vertical plane when the plane of the wings is horizontal and to revolve in a horizontal plane when the plane of the wings is vertical and to revolve in planes between the vertical and the horizontal when the plane of the wings is at any angle between the horizontal and the vertical.

Heretofore, it has been proposed to provide aircraft with movable wings, but all previous attempts to adopt this principle to aircraft have proven unsuccessful as the engines for providing the propulsive power were mounted on the wings making it difficult to move the wings between their horizontal and vertical positions due to the engine weight and its moment about the center of rotation of the wings. Furthermore, conventional airplane power plants could not be used as they are designed for operation with the crankshaft in a horizontal position, and engines of the type generally used in helicopters could not be used becaue they are designed for operation with the crankshaft in a vertical position, and mounting of the engines on the rotatable wings requires that the engines operate in any of the turned positions of the wings between the vertical and the horizontal plane.

The present invention proposes the construction of an aircraft having movable wings and with the engine or engines for driving the propellers mounted in the fuselage in a manner so that the engines will not turn with the wings and thus overcome the objections to previous attempts to provide aircraft with such movable wings.

Still further, the present invention proposes a construction which combines the advantages of a conventionally constructed airplane with those of a helicopter so that the aircraft will have the high speed and efficiency of the conventional airplane in forward flight and the ability of the helicopter to hover and to ascend and descend vertically.

A further object of the invention proposes the construction of an aircraft provided with wings rotatable about spanwise axes and provided with propellers forward of their leading edges and rotated by shafts which move with the wings in a manner so that the propellers will rotate in a vertical plane when the wings are horizontal, to propel the aircraft forwardly, or rotate in a horizontal plane when the wings are vertical to aid the aircraft in hovering or in ascent or descent.

Another object of the present invention proposes the construction of an aircraft having propellers rotatable in a horizontal plane for assisting the aircraft in hovering or in ascending and descending, but which also has the usual wing surfaces which are capable of sustaining the weight of the aircraft in a safe glide to a landing in the event all power within the craft should fail, or in the event the propellers should become damaged.

Still another object of the present invention proposes providing two groups of clutches, one group for selectively disconnecting either of the engines in a manner to permit the remaining engine to drive both of the propellers and the other group for selectively disconnecting one or both of the propellers from its driving connection with the engines in the event one or both of the propellers become damaged.

Still further, the present invention proposes the provision of clutches between the engines and the propellers and controllable by the pilot from his seat to disconnect one or all of the propellers from the engine drive in the event one or more of the engines becomes inoperative providing for autorotation of the propellers.

Another object proposes the construction of an aircraft in which the wings may be conveniently turned between their operating positions while the aircraft is in flight so that the wings may be used in a vertical position permitting the propellers to lift the aircraft to the desired altitude, after which the wings may be turned to a horizontal position to cause the propellers to be used for producing the required thrust for greater forward propulsion efficiency.

The invention proposes various modifications and the rotatable wings are usable on various types of aircraft and with different types of propulsion means; such as, internal combustion engines, turbines and engines operating on the jet or rocket principle or engineless aircraft with jet, ram jet or rocket driven propellers.

It is a further object of this invention to construct an aircraft of the type described which is simple to operate and which is efficient and safe in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

The aircraft, in accordance with the first form of the present invention shown in Figs. 1 to 10, includes a fuselage 20 having the usual landing gear 21 and nose wheel 22. The front end of the fuselage 20 is formed with a stabilizer and elevator 23 and the rear end is formed with the usual rudder 24 having a fixed part 24$^a$ and a movable part 24$^b$. The fuselage is also formed with the usual blister 25 enclosing the pilot's cockpit. The blister 25 may be formed of any suitable transparent material.

Figures 3, 6, 7, 8:
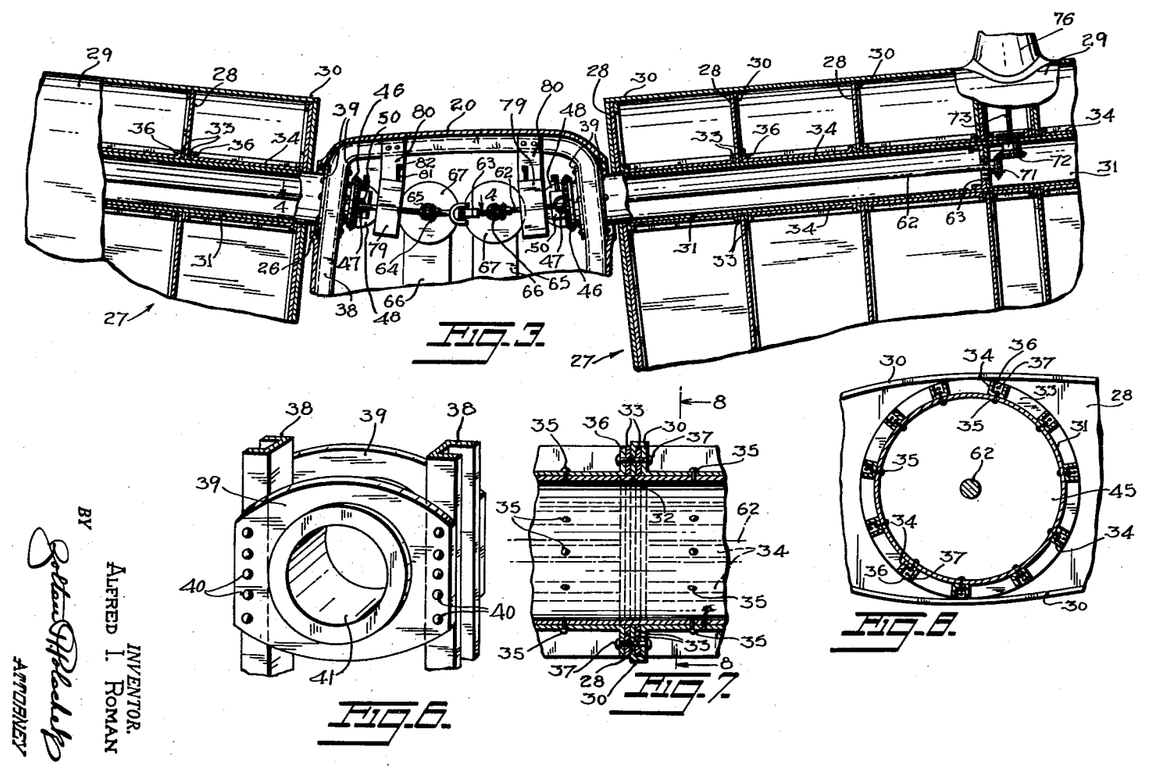
Fig. 3 is a partial enlarged vertical sectional view taken on the line 3—3 of Fig. 1.
Fig. 6 is a perspective view of one of the supports within the fuselage for rotatively supporting the wing.
Fig. 7 is an enlarged detailed view of a portion of Fig. 3.
Fig. 8 is a sectional view taken on the line 8—8 of Fig. 7.

The sides of the fuselage 20 are formed with projections 26 upon which the wings 27 are pivotally mounted. The wings 27 form continuations of the projections 26, when the wings are in the horizontal position, and each wing has the usual ribs 28 covered by the usual metallic skin 29. As clearly shown in Fig. 3, the ribs 28 are formed of thin sheet metal with stiffening flanges 30 to which the metallic skin 29 is attached. Each wing includes a tubular spar 31 which is extended through aligned openings 32 formed in the wing ribs 28. Engaged about the tubular spars 31 on opposite sides of each of the wing ribs 28, there are reenforcing rings 33. Reinforcing channel-shaped members 34 are extended between the reenforcing rings 33 of adjacent wing ribs 28 and are attached to the spars 31 by means of rivets 35 or by welding. The ends of the channel-shaped members 34 are formed with projecting flanges 36 which extend along the exposed faces of the reenforcing rings 33. Rivets 37 engage through the flanges 36, the rings 33 and the wing ribs 28 securing those parts together as an integral unit, as shown in Fig. 7.

The fuselage 20 is formed with longitudinally spaced laterally extending bulkheads 38. Plates 39 are attached internally and externally to opposite sides of the bulkheads 38 by means of rivets 40, and the plates 39 are formed with aligned openings through which tubular members 41 extend.

The inner ends of the wing spars 31 extend through the tubular members 41 and means is provided within each tubular member 41 and its opposite faces for rotatively supporting the wing spar 31 and securing it against lateral movement relative to the tubular member 41. This means comprises spaced bearing races 42 having roller bearings 43 therebetween, the races 42 adjacent the tubular members 41 being retained in position by a shoulder 41$^a$ in member 41. Likewise, the races 42 adjacent the wing spars 31 are retained in position by means of shoulders 31$^a$ formed by rings welded or riveted to spar 31.

The ends of the spars 31 within the fuselage 20 are closed by means of blocks 45 which are integrally formed with bevel gears 46. The bevel gears 46 mesh with bevel gears 47 driven by reversible motors 48 which are supported by means of brackets 49, attached to a structural member of the fuselage 20. The motors 48, when energized, are adapted to turn the wings 27 between their vertical and horizontal positions depending upon the direction in which the motors are turning. The motors 48 are matched for speed and may be kept in step by either electrical or mechanical means. If desired, the motors 48 could be replaced by hydraulically operated means for turning the wings 27. Interposed between the motors 48 and the bevel gears 47, there are clutches 50 having operating levers 51 connected by means of linkage 52 only partially shown in Fig. 4 with controls (not shown) located in close proximity to the pilot's seat by means of which the clutches 50 may be operated to free the bevel gears 47 of their driving connection with the motors 48.

On opposite sides of the bevel gears 46 from the bevel gears 47, there are shafts 53 rotatively supported upon a fixed support (not shown) within the fuselage 20. Mounted on the shafts 53, there are bevel gears 55 which mesh with the bevel gears 46. Also mounted on the shafts 53, there are sprockets 56 over which sprocket chains 57 extend. The opposite sides of the sprocket chains 57 engage over the sprocket wheels 58 mounted on stud shafts 59 rotatively supported upon a fixed support (not shown) within the fuselage 20 on opposite sides of the pilot's seat, not shown. The stud shafts 59 are provided at their free inner ends with handles 61 by which the shafts 59 may be turned to ultimately turn the wing spars 31 and the wings 27 carried thereby through the medium of the sprockets 56 and 58, the sprocket chain 57 and the bevel gear 55. In the event the motors 48 (one or both) should become inoperative, the clutches 50 may be operated to free the bevel gears 47 of their driving connection with the motors 48 freeing the bevel gears 46 to be manually rotated by turning the handles 61.

The stud shafts 59 are formed of separate sections in axial alignment and connected together by means of clutches 60 interposed in the shafts 59 between the sprockets 58 and the handles 61. Normally, the clutches 60 are separated, so that the handles 61 will not turn when the wing spars 31 are turned by the motors 48. However, if it becomes necessary to manually turn the wing spars 31, due to failure of the motors 48, it is merely necessary to press inwards on the handles 61 which will engage the clutches 60 connecting the sections of the stud shafts 59 so that the sprockets 58 will be turned by the handles 61, when the handles are rotated.

If desired, both of the bevel gears 46 could be rotated from a single handle, similar to one of the handles 61 and related mechanism, located on one side of the pilot's seat.

Figures 4, 5, 9:
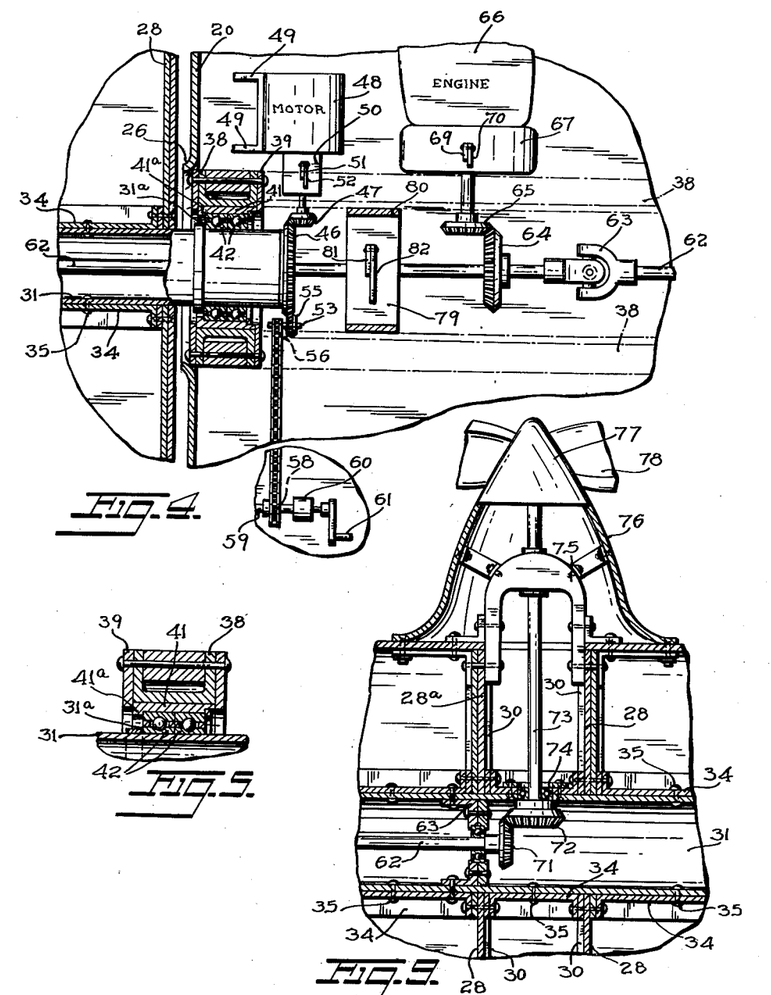
Fig. 4 is an enlarged partial horizontal sectional view taken on the line 4—4 of Fig. 3.
Fig. 5 is an enlarged detailed view of a portion of Fig. 4.
Fig. 9 is an enlarged detailed view of another portion of Fig. 3, completely in section.
Figure 10:
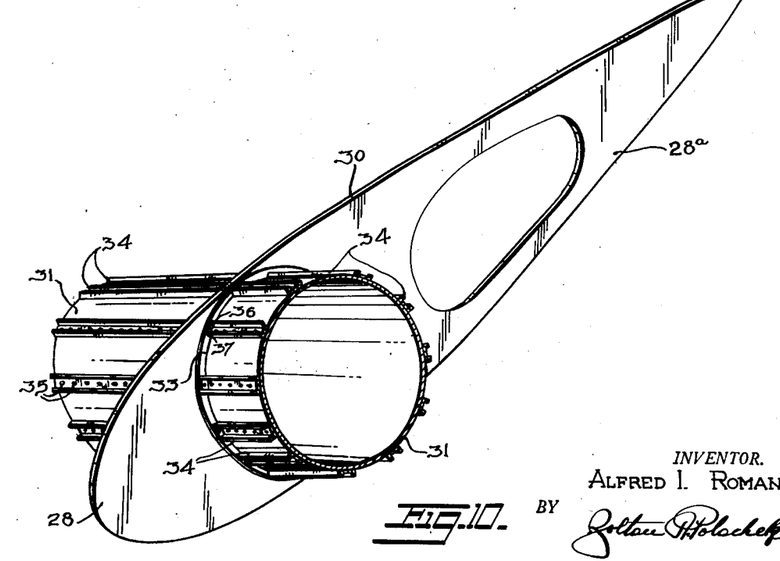
Fig. 10 is a perspective of one of the wing spars showing the attachment to one of the respective wing ribs.

Propeller drive shafts 62 are extended through the wing spars 31 and have their adjacent ends rotatively extended through the blocks 45 and the bevel gears 46, and ball bearings 44, see Fig. 4, are provided within the blocks 45 for freely rotatively supporting the portions of the shafts 62 which pass through the blocks 45. The outer ends of the propeller drive shafts 62 are rotatively supported by brackets 63 supporting bearings and mounted within the spars 31 in alignment with one of the wing ribs 28a, see Figs. 3 and 9. If the wing spars 31 should be particularly long, the propeller drive shafts 62 could be provided at spaced points intermediate of their ends with universal joints (not shown) for permitting the shafts 62 to flex with the wings.

The adjacent ends of the propeller drive shafts 62 within the fuselage 20, are connected together by means of a universal joint 63. Bevel gears 64 are mounted on the propeller drive shafts 62 on opposite sides of the universal joint 63 and those bevel gears 64 mesh with bevel gears 65 adapted to be driven by propeller drive engines 66. Interposed between the bevel gears 65 and the engines 66, there are clutches 67 having projecting operating levers 69. The levers 69 are connected by means of linkage 70, partially shown in Fig. 4, with controls (not shown) located in close proximity to the pilot's seat. In the event trouble should develop in either of the engines 66, its respective clutch 67 may be operated to disconnect its gear 65 from its driving connection with the engine 66 leaving both of the propeller drive shafts 62 to be rotated by the one engine 66.

In place of the manually operated clutches 57, automatic devices may be installed to instantly and automatically disconnect either of the engines 66 from its driving connection with the propeller drive shafts 62 in the event trouble develops in either of the engines 66.

The outer ends of the propeller drive shafts 62 carry bevel gears 71 which mesh with bevel gears 72 mounted on the propeller shafts 73. The propeller shafts 73 extend at right angles to the propeller drive shafts 62 and are projected through openings 74 formed in the sides of the spars 31. The free ends of the propeller shafts 73 are rotatively supported by means of bearing brackets 75 mounted in position between the faces of adjacent wing ribs 28, see Fig. 9. The forward ends of the propeller shafts 73 are rotatively extended through tubular extensions 76 mounted on the leading edges of the wings 27. The free extended ends of the propeller shafts 73 are connected to the hubs 77 of propellers 78.

Figure 1:
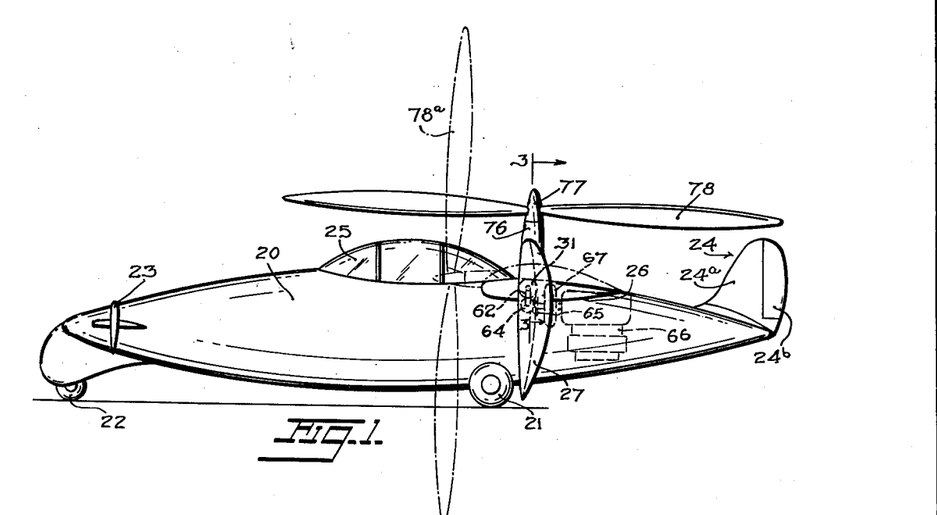
Fig. 1 is a side elevational view of an aircraft constructed in accordance with the present invention.

When the wings 27 are turned to the vertical position shown by the full lines in Fig. 1, the propellers will rotate in a horizontal plane. However, when the wings 27 are turned to their horizontal position, the propellers will rotate in the vertical plane as indicated by the dot and dash lines 78a in Fig. 1.

Mounted in each of the propeller drive shafts 62 between the bevel gears 46 and 64, there are clutches 79. These clutches 79 are supported by means of depending brackets 80, see Figs. 3 and 4, from the overhead portions of the transverse bulkheads 38. The clutches 79 have projecting operating levers 81 connected by means of linkage 82, partially shown in Fig. 4, or by any other conventional means, with controls, not shown, located in close proximity to the pilot's seat. In the event trouble should develop with either of the propellers 78, the respective clutch 79 may be operated to disconnect the defective propeller 78 from its driving connection with its respective engine 66 so that both of the engines 66 may be used to rotate the one operable propeller 78. Or, in the event that both engines fail, both propellers may be disconnected from them, so that they may auto-rotate to provide for a safe landing.

While the clutches 50, 67 and 79 are illustrated as being manually operated, it is appreciated that hydraulically, electro-magnetically or vacuum controlled clutches could be used with the controls located adjacent the pilot's seat. If desired, the clutches could operate automatically, similar to the so-called "free-wheeling" devices.

While the engines 66 may be internal combustion engines, it is appreciated that turbines operated by air or liquid under pressure could be substituted.

On the drawing, separate engines 66 are illustrated for driving each of the propellers 78 and it is appreciated that a single engine could be used, or if desired, dual engines could be used for driving each propeller, with the engines of each pair disposed on opposite sides of the respective propeller drive shafts 62.

Figure 2:
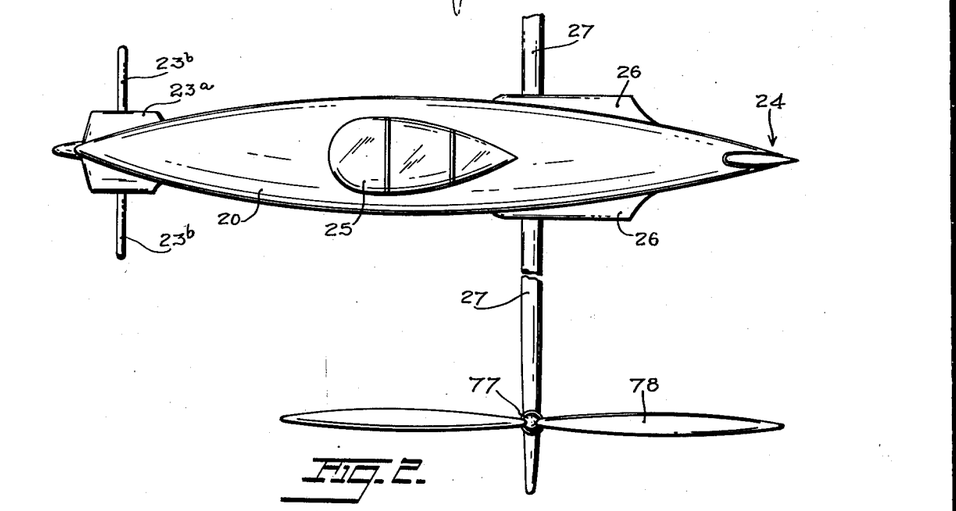
Fig. 2 is a plan view of Fig. 1 having portions thereof broken away so as to reduce the overall size thereof.

With the aircraft resting on the ground, as shown in Figs. 1 and 2, the wings 27 will be in their vertical position. If it is desired to take off, the engines 66 are set in operation to rotate the propellers 78 in the horizontal plane in which event the propellers 78 will serve as rotary wings and cause the aircraft to ascend vertically or nearly vertically as in the case of a helicopter. When the aircraft is airborne and reaches the desired altitude, the motors 48 are set in operation to rotate the wings 27 to a horizontal position, so that the propellers 78 will then rotate in a vertical plane, as indicated by the dot and dash lines 78a in Fig. 1, and produce the desired forward thrust, as in a conventionally constructed airplane. Prior to landing, the motors 48 are rotated in the reverse direction to return the wings 27 back to their vertical position, so that the propellers 78 will again rotate in a horizontal plane and cause the aircraft to hover or descend vertically or nearly vertically. If desired, variable pitch propellers may be used so that the propellers may operate at the most efficient pitch for each flight condition. Also, the aircraft may fly backwards by rotating the wings rearwards past the vertical position shown on the drawings.

Figure 11:
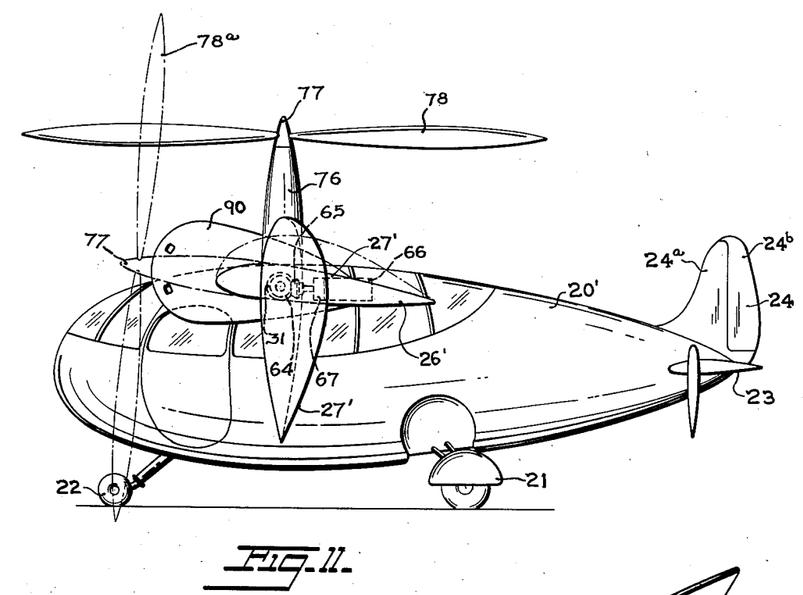
Fig. 11 is a side elevational view of the aircraft constructed in accordance with a modification of the invention.
Figure 12:
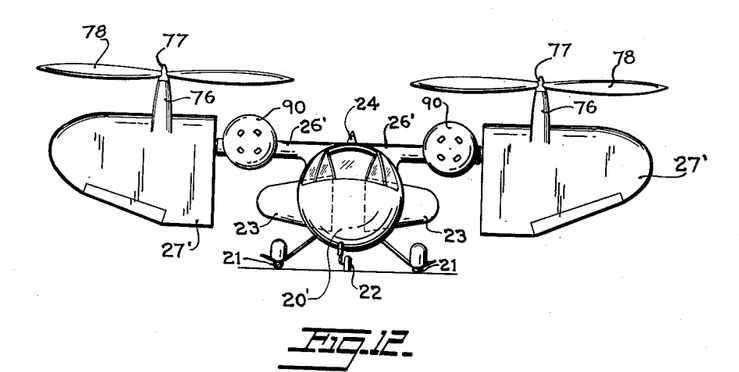
Fig. 12 is a front elevational view of Fig. 11.

In the modification of the invention shown in Figs. 11 and 12, the present invention is shown applied to an aircraft having a fuselage 20' for carrying several passengers. Also, in this form of the invention, the projections 26' are provided with engines 90 (whose position remains fixed in relation to the fuselage 20').

As in the previous form of the invention, the wings 27' are turnably mounted on the outer ends of the projection 26', so that the wings 27' may be turned between vertical and horizontal positions independently of the projections 26' and the engines 90 carried thereby.

When the wings 27' are in the vertical position, the propellers 78 function as rotary wings to cause the aircraft to ascend and descend vertically, but when the wings 27' are turned to the horizontal position, the propellers 78 then function to produce a forward thrust.

In other respects, this form of the invention is similar to that previously described and like numerals identify like parts in each of the several views.

Figure 13:
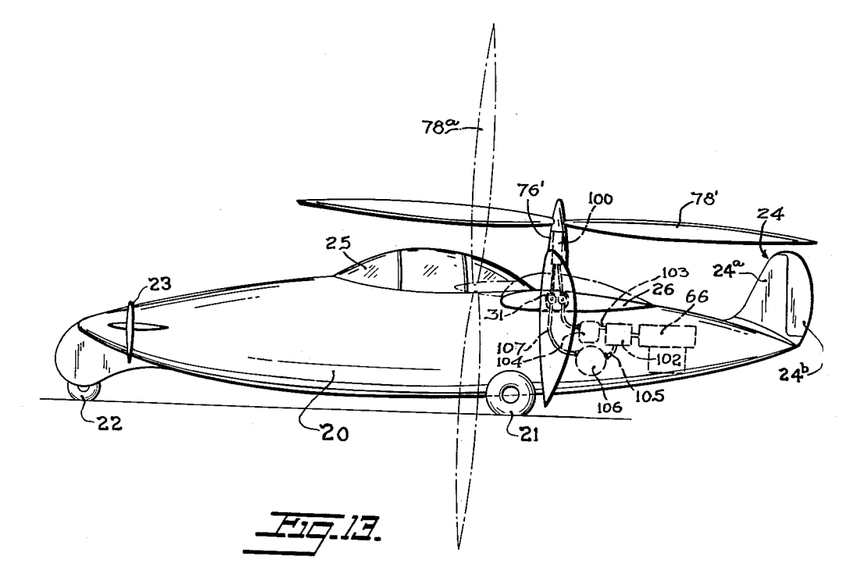
Fig. 13 is a view similar to Fig. 1, but showing a further modification of the invention.

In the modification of the invention shown in Fig. 13 of the drawings, the aircraft is similar to that shown in the first form of the invention differing only in the means for driving the propellers 78'. In this form of the invention, there is a hydraulic turbine 100 mounted in each of the tubular extensions 76' and connected with the propellers 78' for driving the same. Mounted within the fuselage 20, there is an engine 66 for driving a hydraulic pump 102. Tubing 103 connects the intake of the pump 102 with a reservoir 104, which is the source of hydraulic fluid which is to be supplied under pressure to the turbines 100 by the pump 102. A tube 105 connects the discharge of the pump 102 with an accumulator 106 to insure that the fluid fed to the turbines 100 will be supplied under even pressure. Tubing 107 connects the accumulator 106 with the intakes of the turbines 100. Tubes 108 connect the discharges of the turbines with the reservoir 104, so that the fluid after discharging from the turbines 100 may drain back into the reservoir 104.

The tubes 107 and 108 extend through the tubular spars 31 which are equipped with a special coupling to allow the tubing within spars 31 to move in relation to the tubing in the fuselage 20 when the wings 27 are rotated between their vertical and horizontal positions.

In other respects, this form of the invention is similar to that shown in Figs. 1 to 10 and like reference numerals identify like parts in each of the several views.

Figure 14:
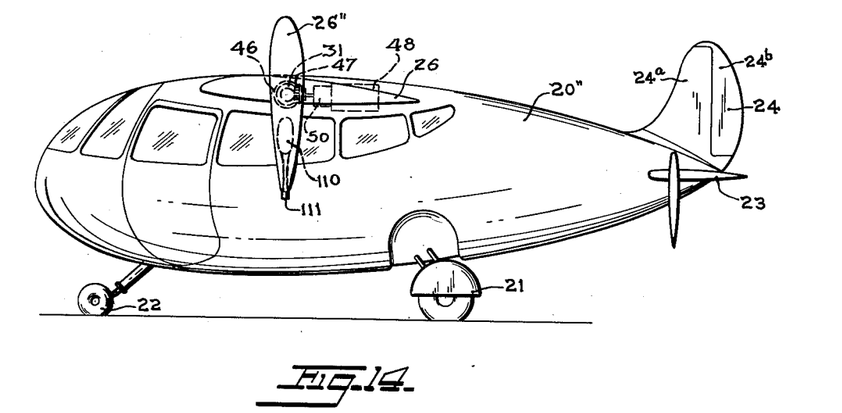
Fig. 14 is a further side elevational view of an aircraft constructed in accordance with a further modification of the invention.

In the modification of the invention shown in Fig. 14, the shape of the fuselage 20'' is somewhat similar to the fuselage shown in the form of the invention disclosed in Figs. 11 and 12.

However, this form of the invention differs in that the wings 26'' are provided with rockets 110 which discharge through nozzles 111 which are located in the trailing edges of the wings 26''.

If the rockets 110 are of the liquid fuel type, the fuel tanks may be installed in the fuselage with suitable pipes leading to the rocket motors in the wings 26'', or if desired, jet engines could be mounted in the fuselage and connected by means of suitable ducts with the nozzles in the trailing edges of the wings 26''.

The mechanism for turning the wings between the horizontal and vertical positions is similar to that shown in connection with the first form of the invention, except that no propeller drive shafts are required.

In other respects, this form of the invention is similar to that previously shown and like reference numerals identify like parts in each of the several views.

Figures 15, 16, 17:
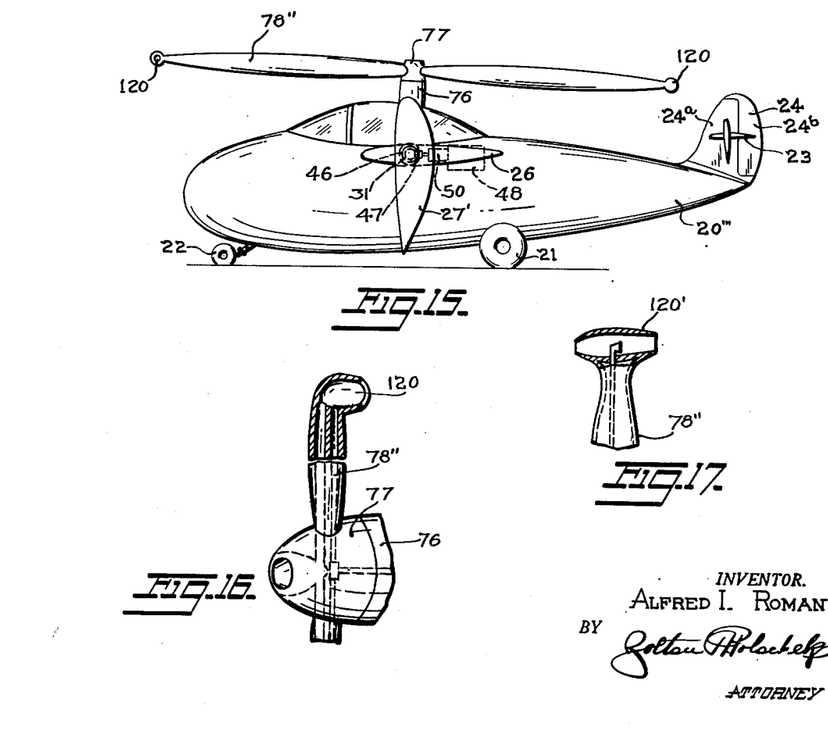
Fig. 15 is a side elevational view of an aircraft constructed in accordance with a still further modification of the invention.
Fig. 16 is an enlarged perspective view of a portion of Fig. 15.
Fig. 17 is a side elevational view similar to a portion of Fig. 16, but illustrating another modification of the invention.

In the modification of the invention shown in Figs. 15 and 16, the wings 26 are provided with propellers 78'' having the ends of their blades formed with jet discharge nozzles 120 similar to known types of jet driven propellers.

The means for turning the wings 27' between vertical and horizontal positions is again similar to that disclosed in connection with the first form of the invention, except that conventional engines are eliminated and no propeller drive shafts extend through the tubular spars 31'.

In other respects, the form of the invention is similar to that previously shown and like reference numerals identify like parts in each of the several views.

In the form of the invention shown in Fig. 17, the tips of the propeller 78'' are provided with nozzles 120' of the ram-jet type similar to present types of ram-jet construction.

In other respects, this form of the invention is similar to that shown in Figs. 15 and 16 and like reference numerals are used to identify like parts in each of the several views.

Figure 18:
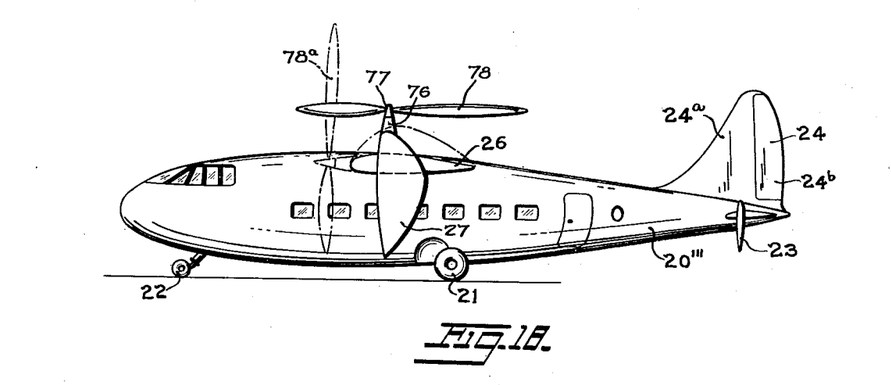
Fig. 18 is a side elevational view of a transport-type aircraft incorporating the operative features of the first form of the invention.
Figure 19:
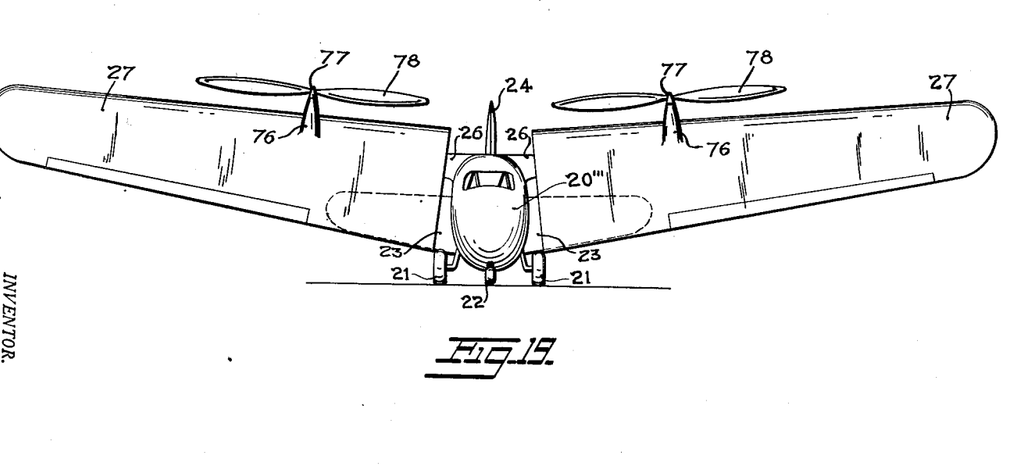
Fig. 19 is a front elevational view of Fig. 18.

In the modification of the invention shown in Figs. 18 and 19, the wing operating mechanism and propeller drive means of the first form of the invention, shown in Figs. 1 to 10, are shown applied to a transport-type aircraft having an enlarged fuselage 20'''.

In other respects, this form of the invention is similar to that previously shown and like reference numerals identify like parts in each of the several views.

If the aircraft is proivded with propellers driven by gas turbines or turbo-propellers, provision can be made for deflecting exhaust gases downwards or upwards during vertical ascent or descent.

It is to be understood that the stabilizer and/or elevator may be rotated in synchronism with the wings of the aircraft, so that they may assume the same position relative to the fuselage as the wings.

My invention may be incorporated in any other style of aircraft, such as a tailless aircraft or one without a stabilizer or elevator.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of said wing spars to rotate said wings between horizontal and vertical positions relative to the fuselage.

2. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of said wing spars to rotate said wings between horizontal and vertical positions relative to the fuselage, and means reinforcing said wing spars between the wing ribs.

3. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of said wing spars to rotate said wings between horizontal and vertical positions relative to the fuselage, reinforcing rings engaged about said wing spars on opposite sides of the ribs of said wings, spanwise extending channel-shaped members extended between the adjacent faces of said rings spaced about the periphery of said spars, means securing said channel-shaped members to said spars, flanges formed on the ends of said channel-shaped members and projected along the faces of said rings, and means securing the wing ribs, said rings and said flanges together as a unit.

4. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of said wing spars to rotate said wings between horizontal and vertical positions relative to the fuselage, reinforcing rings engaged about said wing spars on opposite sides of the ribs of said wings, spanwise extending channel-shaped members extended between the adjacent faces of said rings spaced about the periphery of said spars, means securing said channel-shaped members to said spars, said securing means comprising welding, flanges formed on the ends of said channel-shaped members and projected along the faces of said rings, and means securing the wing ribs, said rings and said flanges together as a unit.

5. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of sid wing spars to rotate said wings between horizontal and vertical positions relative to the fuselage, reinforcing rings engaged about said wing spars on opposite sides of the ribs of said wings, spanwise extending channel-shaped members extended between the adjacent faces of said rings spaced about the periphery of said spars, means securing said channel-shaped members to said spars, said securing means comprising rivets engaged through said channel-shaped members and said spars, flanges formed on the ends of said channel-shaped members and projected along the faces of said rings, and means securing the wing ribs, said rings and said flanges together as a unit.

6. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and through which the inner ends of said wing spars rotatively extend, a reinforcing means at the inner ends of said wing spars, and means within the fuselage for turning the inner ends of said wing spars to rotate said wings between horizontal and vertical positions relative to the fuselage, reinforcing rings engaged about said wing spars on opposite sides of the ribs of said wings, spanwise extending channel-shaped members extended between the adjacent faces of said rings spaced about the periphery of said spars, means securing said channel-shaped members to said spars, flanges formed on the ends of said channel-shaped members and projected along the faces of said rings, and means securing the wing ribs, said rings and said flanges together as a unit, said latter-mentioned means comprising rivets engaged through the wing ribs, said rings and said flanges.

7. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, and means within the fuselage for turning the inner ends of said wing spars to rotate said wings between horizontal and vertical positions relative to the fuselage.

8. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, and means within the fuselage for turning the inner ends of said wing spars to rotate said wings between horizontal and vertical positions relative to the fuselage, said turning means comprising gears mounted on the inboard ends of said spars, a motor for each of said wing spars mounted within the fuselage, driven shafts extending from the motors, and gears on said driven shafts meshing with said first-mentioned gears.

9. In an aircraft having a fuselage and wings with laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, and means within the fuselage for turning the inner ends of said wing spars to rotate said wings between horizontal and vertical positions relative to the fuselage, said turning means comprising gears mounted on the inboard ends of said spars, a motor for each of said wing spars mounted within the fuselage, driven shafts extending from the motors, and gears on said driven shafts meshing with said first-mentioned gears, means interposed in said driven shafts for freeing said gears from said motors and manual means for turning said spars in one direction or another.

10. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of said wings, means for driving said propellers comprising drive shafts extending from said propellers into the wings, said drive shafts being extended through openings in the wing spars, gears mounted on the aft ends of said drive shafts and meshing with gears mounted on the outboard ends of spanwise extending shafts rotatively supported within the wing spars and connected with each other within the fuselage by means of a flexible joint, engines geared to said shafts and provided with clutches to disconnect said engines when desired, and means within the fuselage for engaging the inner ends of said wing spars to rotate said wings between horizontal and vertical positions relative to the fuselage.

11. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of said wings, means for driving said propellers comprising drive shafts extending from said propellers into the wings, said drive shafts being extended through openings in the wing spars, gears mounted on the aft ends of said drive shafts and meshing with gears mounted on the outboard ends of spanwise extending shafts rotatively supported within the wing spars and connected with each other within the fuselage by means of a flexible joint, engines geared to said shafts and provided with clutches to disconnect said engines when desired, and means within the fuselage for turning the inner ends of said wing spars to rotate said wings between horizontal and vertical positions relative to the fuselage, said turning means comprising gears mounted on the inboard ends of said wing spars, shafts rotatively supported adjacent said gears, gears mounted on said shafts and meshing with said first-mentioned gears, clutches interposed in said shafts for disconnecting said spars from said motors, and means for manually or mechanically rotating said shafts in one direction or the other for similarly rotating said wing spars.

12. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of said wings, means for driving said propellers comprising drive shafts extending from said propellers into the wings, said drive shafts being extended through openings in the wing spars, gears mounted on the aft ends of said drive shafts and meshing with gears mounted on the outboard ends of spanwise extending shafts rotatively supported within the wing spars and connected with each other within the fuselage by means of a flexible joint, engines geared to said spanwise extending shafts and provided with clutches to disconnect said engines when desired, and means within the fuselage for turning the inner ends of said wing spars to rotate said wings between horizontal and vertical positions relative to the fuselage, said turning means comprising gears mounted on the inboard ends of said wing spars, a motor for each of said wing spars mounted within the fuselage, driven shafts extending from said motors, gears on said driven shafts meshing with said spar gears, manually operable means for rotating said first-mentioned gears, and clutches interposed in said driven shafts, so arranged and constructed that when said motors become inoperative said clutches will disengage the motors so that said spar gears are manually turned in one direction or the other to similarly rotate said wing spars.

13. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of said wings, means for driving said propellers comprising drive shafts extending from said propellers into the wings, said drive shafts being extended through openings in the wing spars, gears mounted on the aft ends of said drive shafts and meshing with gears mounted on the outboard ends of spanwise extending shafts rotatively supported within the wing spars and connected with each other within the fuselage by means of a flexible joint, engines geared to said spanwise extending shafts and provided with clutches to disconnect said engines when desired, and means within the fuselage for turning the inner ends of said wing spars to rotate said wings between horizontal and vertical positions relative to the fuselage, said turning means comprising gears mounted on the inboard ends of said wing spars, a motor for each of said wing spars mounted within the fuselage, driven shafts extending from said motors, gears on said driven shafts meshing with said spar gears, manually operable means for rotating said first-mentioned gears, and clutches interposed in said driven shafts, so arranged and constructed that when said motors become inoperative said clutches will disengage the motors so that said spar gears are manually turned in one direction or the other to similarly rotate said wing spars, and manually operable means for rotating said wing spars comprising shafts rotatively supported adjacent said wing spar gears, gears mounted on said latter-mentioned shafts and meshing with said wing spar gears, means for manually rotating said latter-mentioned shafts in one direction or the other, and clutches interposed in said latter-mentioned shafts.

14. In an aircraft having a fuselage formed with laterally extending projections and wings having laterally spaced wing ribs and being projected laterally from said projections, means for rotatively supporting the wings for rotation relative to the projections, comprising tubular wing spars extended transversely through the ribs of the wings and through said projections, the fuselage being formed with openings into which the inboard ends of the wind spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of the wings, means within the fuselage for turning the inner ends of said wing spars to rotate the wings between horizontal and vertical positions relative to the fuselage, means for driving said propellers, said driving means comprising spanwise extending shafts rotatively supported within the wing spars and connected with each other within the fuselage by means of a flexible joint, engines mounted on said fuselage projections and geared to said shafts, clutches provided to disconnect said engines when desired, drive shafts extending from said propellers into the wings, said drive shafts being extended through openings in the wing spars, gears mounted on the aft ends of said drive shafts and meshing with gears mounted on the outboard ends of said spanwise extending shafts.

15. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propulsion means comprising rocket combustion chambers in the wings, drawing fuel from tanks in the fuselage and discharging through nozzles in the trailing edges of the wings, and means within the fuselage for turning the inner ends of said wing spars to rotate said wings between horizontal and vertical positions relative to the fuselage.

16. In an aircraft having a fuselage and wings having laterally spaced wing ribs and being projected laterally from the sides of the fuselage, means for rotatively supporting the wings for rotation relative to the fuselage, comprising tubular wing spars extended transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wings spars rotatively extend, a reinforcing means at the inner ends of said wing spars, propulsion means comprising a jet engine in said fuselage and connected by means of ducts to discharge through nozzles in the trailing edges of the wings, and means within the fuselage for turning the inner ends of said wing spars to rotate said wings between horizontal and vertical positions relative to the fuselage.

17. In an aircraft having a fuselage and wings having laterally spaced wing ribs and being projected laterally from the sides of the fuselage, means for rotatively supporting the wings for rotation relative to the fuselage, comprising tubular wing spars extending transversely through the ribs of the wings and having their inboard ends projecting from the inboard ends of the wings, the fuselage being formed with openings into which the inboard ends of the wing spars project, bulkheads in the fuselage forward and aft of said openings, plates mounted on the inner and outer sides of said bulkheads and formed with openings aligned with the openings of the fuselage, tubular members fixedly mounted within the openings of said plates and supporting bearings through which the inner ends of said wing spars rotatively extend, a reinforcing means at the inner ends of said wing spars, propellers mounted outboard on the leading edges of said wings, said propellers being driven by the reaction of hot gases produced by combustion, discharging from the propeller tips, and means within the fuselage for turning the inner ends of said wing spars to rotate said wings between horizontal and vertical positions relative to the fuselage.

ALFRED I. ROMAN.

REFERENCES CITED

The following references are of record in the file of this patent:

UNITED STATES PATENTS

| Number | Name | Date |
| --- | --- | --- |
| 1,742,082 | Keller | Dec. 31, 1939 |
| 1,747,334 | Sundstedt | Feb. 18, 1930 |
| 1,786,545 | Noeggrerath | Dec. 30, 1930 |
| 1,827,438 | Rauch | Oct. 13, 1931 |
| 1,846,992 | Decker | Feb. 23, 1932 |
| 1,871,538 | Leupold | Aug. 16, 1932 |
| 1,889,255 | Leray | Nov. 29, 1932 |
| 1,951,817 | Blount | Mar. 20, 1934 |
| 2,026,885 | Gaddard | Jan. 7, 1936 |
| 2,081,151 | Meyers | May 25, 1937 |
| 2,142,601 | Bleecker | Jan. 3, 1939 |
| 2,284,902 | Hosford | June 2, 1942 |
| 2,414,766 | Platt | Jan. 21, 1947 |

FOREIGN PATENTS

| Number | Country | Date |
| --- | --- | --- |
| 526,104 | Great Britain | Sept. 11, 1940 |
| 793,426 | France | Nov. 23, 1935 |